(12) United States Patent
Miyamoto et al.

(10) Patent No.: US 10,409,179 B1
(45) Date of Patent: Sep. 10, 2019

(54) ELECTROPHOTOGRAPHIC PHOTORECEPTOR, PROCESS CARTRIDGE, AND IMAGE FORMING APPARATUS

(71) Applicant: FUJI XEROX CO., LTD., Tokyo (JP)

(72) Inventors: Masahiko Miyamoto, Kanagawa (JP); Hideya Katsuhara, Kanagawa (JP); Takeshi Iwanaga, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/053,819

(22) Filed: Aug. 3, 2018

(30) Foreign Application Priority Data

Apr. 4, 2018 (JP) ................... 2018-072570

(51) Int. Cl.
| | | |
|---|---|---|
| *G03G 5/047* | (2006.01) | |
| *G03G 5/05* | (2006.01) | |
| *C09B 67/12* | (2006.01) | |
| *G03G 5/06* | (2006.01) | |

(52) U.S. Cl.
CPC ......... *G03G 5/047* (2013.01); *C09B 67/0016* (2013.01); *G03G 5/0539* (2013.01); *G03G 5/0546* (2013.01); *G03G 5/0696* (2013.01)

(58) Field of Classification Search
CPC .. G03G 5/0546; G03G 5/0539; G03G 5/0696; G03G 5/047
USPC ................................. 430/59.4, 96
See application file for complete search history.

(56) References Cited

U.S. PATENT DOCUMENTS

| | | | |
|---|---|---|---|
| 5,298,617 A | 3/1994 | Nukada et al. | |
| 5,302,479 A | 4/1994 | Daimon et al. | |
| 5,378,569 A | 1/1995 | Nukada et al. | |
| 5,393,629 A | 2/1995 | Nukada et al. | |
| 5,430,526 A * | 7/1995 | Ohkubo ............. | G03G 15/0233 399/159 |
| 5,459,004 A | 10/1995 | Katsumi et al. | |
| 7,462,431 B2 * | 12/2008 | Chen ................... | G03G 5/0503 430/133 |

FOREIGN PATENT DOCUMENTS

| | | |
|---|---|---|
| EP | 0710893 | 5/1996 |
| JP | H04-189873 | 7/1992 |
| JP | H05-098181 | 4/1993 |
| JP | H05-140472 | 6/1993 |
| JP | H05-140473 | 6/1993 |
| JP | H05-263007 | 10/1993 |
| JP | H05-279591 | 10/1993 |
| JP | H08-176293 | 7/1996 |
| JP | H08-208820 | 8/1996 |
| JP | H10-148954 | 6/1998 |

OTHER PUBLICATIONS

Grant et al., Grant & Hackh's Chemical Dictionary, fifth edition, McGraw-Hill Book Company, NY (1987), pp. 350 and 620. (Year: 1987).*

* cited by examiner

*Primary Examiner* — Janis L Dote
(74) *Attorney, Agent, or Firm* — JCIPRNET

(57) ABSTRACT

An electrophotographic photoreceptor includes a conductive support, a charge generation layer disposed on the conductive support, and a charge transport layer disposed on the charge generation layer. The charge generation layer includes a charge generating material and a vinyl copolymer. The vinyl copolymer includes a structural unit including a chlorine atom, a structural unit including an acyloxy group, and a structural unit including two or more carboxyl groups. The proportion of the structural unit including an acyloxy group to all of the structural units is 13.4 mol % or more and 20.0 mol % or less. The charge transport layer includes a charge transporting material and a binder resin.

13 Claims, 2 Drawing Sheets

US 10,409,179 B1

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2018-072570 filed Apr. 4, 2018.

BACKGROUND

(i) Technical Field

The present invention relates to an electrophotographic photoreceptor, a process cartridge, and an image forming apparatus.

(ii) Related Art

Electrophotographic image forming apparatuses have been used as an image forming apparatus included in copying machines, laser beam printers, and the like. Organic photoreceptors that include an organic photoconductive material have been commonly used as an electrophotographic photoreceptor included in such an image forming apparatus.

When an image is formed using an image forming apparatus with an electrophotographic photoreceptor that includes a conductive support, a charge generation layer disposed on the conductive support, and a charge transport layer disposed on the charge generation layer, the potential of a portion of the surface of the electrophotographic photoreceptor on which an image was formed in the previous image formation cycle may be reduced in the next image formation cycle. Consequently, the portion of the surface of the electrophotographic photoreceptor having a reduced potential, that is, a portion of the image formed in the previous image formation cycle, may appear dark in the next image formation cycle (hereinafter, this phenomenon is referred to as "positive ghosting"). This results in the occurrence of image defects in an image formed in the next image formation cycle.

SUMMARY

According to an aspect of the invention, there is provided an electrophotographic photoreceptor including a conductive support; a charge generation layer disposed on the conductive support, the charge generation layer including a charge generating material and a vinyl copolymer, the vinyl copolymer including a structural unit including a chlorine atom, a structural unit including an acyloxy group, and a structural unit including two or more carboxyl groups, the proportion of the structural unit including an acyloxy group to all of the structural units being 13.4 mol % or more and 20.0 mol % or less; and a charge transport layer disposed on the charge generation layer.

BRIEF DESCRIPTION OF THE DRAWINGS

Exemplary embodiments of the present invention will be described in detail based on the following figures, wherein.

DETAILED DESCRIPTION

Figure 1:
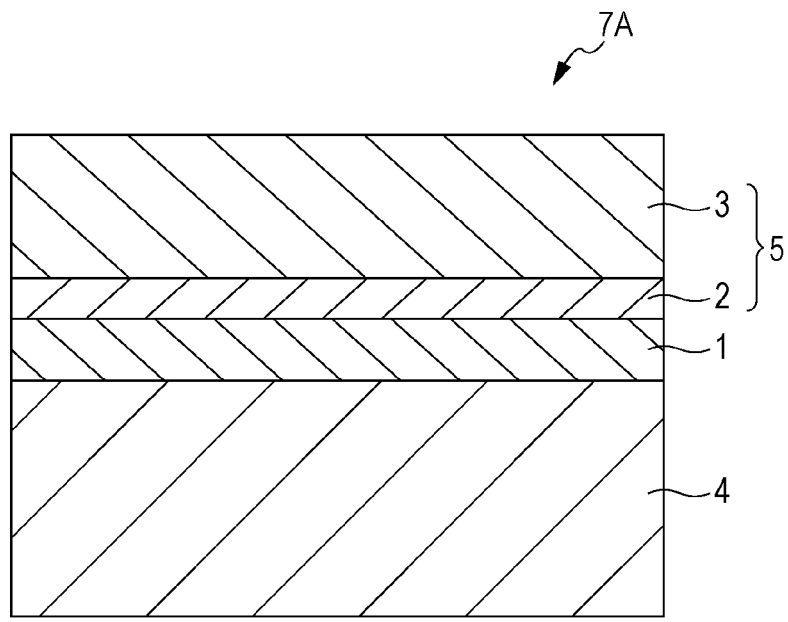
FIG. 1 is a schematic partial cross-sectional view of an electrophotographic photoreceptor according to an exemplary embodiment, illustrating an example of the arrangement of layers constituting the electrophotographic photoreceptor.

Exemplary embodiments of the invention are described in detail below.

Electrophotographic Photoreceptor

An electrophotographic photoreceptor according to an exemplary embodiment (hereinafter, referred to as "photoreceptor") includes a conductive support, a charge generation layer disposed on the conductive support, and a charge transport layer disposed on the charge generation layer.

The charge generation layer includes a charge generating material and a vinyl copolymer. The vinyl copolymer includes a structural unit including a chlorine atom (hereinafter, referred to as "chlorine-containing component"), a structural unit including an acyloxy group (hereinafter, referred to as "acyloxy component"), and a structural unit including two or more carboxyl groups (hereinafter, referred to as "polycarboxyl component"). The proportion of the acyloxy component to all of the structural units constituting the vinyl copolymer is 13.4 mol % or more and 20.0 mol % or less.

The chlorine-containing component, that is, the structural unit including a chlorine atom, is a structural unit that includes a chlorine atom and does not include either an acyloxy group or two or more carboxyl groups. The chlorine-containing component may optionally include a substituent group other than the above groups, such as an alkyl group. The acyloxy component, that is, the structural unit including an acyloxy group, may be any structural unit that includes an acyloxy group. The acyloxy component may include a substituent group other than an acyloxy group, such as an alkyl group. The polycarboxyl component, that is, the structural unit including two or more carboxyl groups, is a structural unit that includes two or more carboxyl groups and does not include an acyloxy group. The polycarboxyl component may include a substituent group other than the above groups, such as an alkyl group.

When an image is formed using an image forming apparatus with an electrophotographic photoreceptor that includes a conductive support, a charge generation layer disposed on the conductive support, and a charge transport layer disposed on the charge generation layer, a portion of the image formed in the previous image formation cycle may appear dark in the image formed in the next image formation cycle (positive ghosting).

It is considered that positive ghosting occurs by the following mechanisms. Specifically, upon the surface of the photoreceptor being exposed to light in the previous image formation cycle, charge carriers accumulate at charge traps present in the charge generation layer. The charge carriers are released from the charge traps after the surface of the photoreceptor has been charged in the next image formation cycle and migrate to the surface of the photoreceptor. This results in the partial reduction in the surface potential of the photoreceptor. It is considered that the portion of the surface of the electrophotographic photoreceptor having a reduced potential, that is, a portion of the image formed in the previous image formation cycle, appears dark in the image formed in the next image formation cycle.

In this exemplary embodiment, the charge generation layer includes a vinyl copolymer that includes the chlorine-containing component, the acyloxy component, and the polycarboxyl component, wherein the proportion of the acyloxy component is 13.4 mol % or more and 20.0 mol % or less (hereinafter, this vinyl copolymer is referred to as "specific copolymer"). In this exemplary embodiment, the occurrence of positive ghosting may be reduced because the vinyl copolymer included in the charge generation layer is the specific copolymer. While the reasons for this are uncertain, it is considered that the occurrence of positive ghosting is reduced by the following mechanisms.

It is considered that the charge traps present in the charge generation layer are formed as a result of the electrical interaction between the charge generating material and the binder resin included in the charge generation layer. In the case where the binder resin is a vinyl copolymer that includes the chlorine-containing component, the acyloxy component, and the polycarboxyl component, the proportion of the acyloxy component is considered to affect the formation of the charge traps. Specifically, it is considered that setting the proportion of the acyloxy component to fall within the above range may enable a suitable interaction between the charge generating material and the acyloxy component and the polycarboxyl component of the vinyl copolymer. This may reduce the amount of charge traps formed in the charge generation layer.

A reduction in the amount of charge traps formed in the charge generation layer leads to a reduction in the amount of charge carriers accumulated at the charge traps upon the surface of the photoreceptor being exposed to light in the previous image formation cycle and, accordingly, a reduction in the amount of charge carriers released after the surface of the photoreceptor has been charged in the next image formation cycle. This limits the partial reduction in the surface potential of the photoreceptor and, consequently, the occurrence of positive ghosting, in which a portion of the image formed in the previous image formation cycle appears dark in the image formed in the next image formation cycle.

For the above reasons, it is considered that the photoreceptor according to this exemplary embodiment may reduce the occurrence of image defects caused due to positive ghosting.

The electrophotographic photoreceptor according to this exemplary embodiment is described below with reference to the attached drawings.

FIG. 1 is a schematic partial cross-sectional view of an electrophotographic photoreceptor 7A according to this exemplary embodiment, illustrating an example of the arrangement of layers constituting the photoreceptor. The electrophotographic photoreceptor 7A illustrated in FIG. 1 includes a conductive support 4, an undercoat layer 1, a charge generation layer 2, and a charge transport layer 3 that are stacked on top of one another in this order. The charge generation layer 2 and the charge transport layer 3 constitute a photosensitive layer 5.

The undercoat layer 1 is optional. In other words, in the electrophotographic photoreceptor 7A, the charge generation layer 2 may be disposed on the conductive support 4 directly, that is, without the undercoat layer 1 interposed therebetween.

The electrophotographic photoreceptor 7A may optionally include other layers. Examples of the other layers include a protective layer that may be further disposed on the charge transport layer 3.

The layers constituting the electrophotographic photoreceptor according to this exemplary embodiment are described in detail below. Hereinafter, the reference numerals of the components of the electrophotographic photoreceptor are omitted.

Conductive Support

Examples of the conductive support include a metal sheet, a metal drum, and a metal belt that are made of a metal such as aluminum, copper, zinc, chromium, nickel, molybdenum, vanadium, indium, gold, or platinum or an alloy such as stainless steel. Other examples of the conductive support include a paper sheet, a resin film, and a belt on which a conductive compound such as a conductive polymer or indium oxide, a metal such as aluminum, palladium, or gold, or an alloy is deposited by coating, vapor deposition, or lamination. The term "conductive" used herein refers to having a volume resistivity of less than $10^{13}$ Ωcm.

In the case where the electrophotographic photoreceptor is used as a component of a laser printer, the surface of the conductive support may be roughened such that the centerline average roughness Ra of the surface of the conductive support is 0.04 μm or more and 0.5 μm or less in order to reduce interference fringes formed when the photoreceptor is irradiated with a laser beam. On the other hand, it is not necessary to roughen the surface of the conductive support in order to reduce the formation of interference fringes in the case where an incoherent light source is used. However, roughening the surface of the conductive support may increase the service life of the photoreceptor by reducing the occurrence of defects caused due to the irregularities formed in the surface of the conductive support.

For roughening the surface of the conductive support, for example, the following methods may be employed: wet honing in which a suspension prepared by suspending abrasive particles in water is blown onto the surface of the conductive support; centerless grinding in which the conductive support is continuously ground with rotating grinding wheels brought into pressure contact with the conductive support; and an anodic oxidation treatment.

Another example of the roughening method is a method in which, instead of roughening the surface of the conductive support, a layer is formed on the surface of the conductive support by using a resin including conductive or semiconductive powder particles dispersed therein such that a rough surface is formed due to the particles dispersed in the layer.

In a roughening treatment using anodic oxidation, an oxidation film is formed on the surface of a conductive support made of a metal, such as aluminum, by performing anodic oxidation using the conductive support as an anode in an electrolyte solution. Examples of the electrolyte solution include a sulfuric acid solution and an oxalic acid solution. A porous anodic oxidation film formed by anodic oxidation is originally chemically active and likely to become contaminated. In addition, the resistance of the porous anodic oxidation film is likely to fluctuate widely with the environment. Accordingly, the porous anodic oxidation film may be subjected to a pore-sealing treatment in which micropores formed in the oxide film are sealed using volume expansion caused by a hydration reaction of the oxidation film in steam under pressure or in boiled water that may include a salt of a metal, such as nickel, so as to be converted into a more stable hydrous oxide film.

The thickness of the anodic oxidation film may be, for example, 0.3 μm or more and 15 μm or less. When the thickness of the anodic oxidation film falls within the above range, the anodic oxidation film may serve as a barrier to injection. Furthermore, an increase in the potential that remains on the photoreceptor after the repeated use of the photoreceptor may be limited.

The conductive support may be subjected to a treatment in which an acidic treatment liquid is used or a boehmite treatment.

The treatment in which an acidic treatment liquid is used is performed in, for example, the following manner. An acidic treatment liquid that includes phosphoric acid, chromium acid, and hydrofluoric acid is prepared. The proportions of the phosphoric acid, chromium acid, and hydrofluoric acid in the acidic treatment liquid may be, for example, 10% by weight or more and 11% by weight or less, 3% by weight or more and 5% by weight or less, and 0.5% by weight or more and 2% by weight or less, respectively. The total concentration of the above acids may be 13.5% by weight or more and 18% by weight or less. The treatment temperature may be, for example, 42° C. or more and 48° C. or less. The thickness of the resulting coating film may be 0.3 µm or more and 15 µm or less.

In the boehmite treatment, for example, the conductive support is immersed in pure water having a temperature of 90° C. or more and 100° C. or less for 5 to 60 minutes or brought into contact with steam having a temperature of 90° C. or more and 120° C. or less for 5 to 60 minutes. The thickness of the resulting coating film may be 0.1 µm or more and 5 µm or less. The coating film may optionally be subjected to an anodic oxidation treatment with an electrolyte solution in which the coating film is hardly soluble, such as adipic acid, boric acid, a boric acid salt, a phosphoric acid salt, a phthalic acid salt, a maleic acid salt, a benzoic acid salt, a tartaric acid salt, or a citric acid salt.

Undercoat Layer

The undercoat layer includes, for example, inorganic particles and a binder resin.

The inorganic particles may have, for example, a powder resistivity (i.e., volume resistivity) of $10^2$ Ωcm or more and $10^{11}$ Ωcm or less.

Among such inorganic particles having the above resistivity, for example, metal oxide particles such as tin oxide particles, titanium oxide particles, zinc oxide particles, and zirconium oxide particles are preferable and zinc oxide particles are particularly preferable.

The BET specific surface area of the inorganic particles may be, for example, 10 $m^2/g$ or more.

The volume-average diameter of the inorganic particles may be, for example, 50 nm or more and 2,000 nm or less and is preferably 60 nm or more and 1,000 nm or less.

The content of the inorganic particles is preferably, for example, 10% by weight or more and 80% by weight or less and is more preferably 40% by weight or more and 80% by weight or less of the amount of binder resin.

The inorganic particles may optionally be subjected to a surface treatment. It is possible to use two or more types of inorganic particles which have been subjected to different surface treatments or have different diameters in a mixture.

Examples of an agent used in the surface treatment include a silane coupling agent, a titanate coupling agent, an aluminum coupling agent, and a surfactant. In particular, a silane coupling agent is preferable, and a silane coupling agent including an amino group is more preferable.

Examples of the silane coupling agent including an amino group include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

Two or more silane coupling agents may be used in a mixture. For example, a silane coupling agent including an amino group may be used in combination with another type of silane coupling agent. Examples of the other type of silane coupling agent include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

A method for treating the surface of the inorganic particles with the surface-treating agent is not limited, and any known surface treatment method may be employed. Both dry process and wet process may be employed.

The amount of surface-treating agent used may be, for example, 0.5% by weight or more and 10% by weight or less of the amount of inorganic particles.

The undercoat layer may include an electron accepting compound (i.e., an acceptor compound) in addition to the inorganic particles in order to enhance the long-term stability of electrical properties and carrier-blocking property.

Examples of the electron accepting compound include the following electron transporting substances: quinones, such as chloranil and bromanil; tetracyanoquinodimethanes; fluorenones, such as 2,4,7-trinitrofluorenone and 2,4,5,7-tetranitro-9-fluorenone; oxadiazoles, such as 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; xanthones; thiophenes; and diphenoquinones, such as 3,3',5,5'-tetra-t-butyldiphenoquinone.

In particular, compounds including an anthraquinone structure may be used as an electron accepting compound. Examples of the compounds including an anthraquinone structure include hydroxyanthraquinones, aminoanthraquinones, and aminohydroxyanthraquinones. Specific examples thereof include anthraquinone, alizarin, quinizarin, anthrarufin, and purpurin.

The electron accepting compound may be dispersed in the undercoat layer together with the inorganic particles or deposited on the surfaces of the inorganic particles.

For depositing the electron accepting compound on the surfaces of the inorganic particles, for example, a dry process or a wet process may be employed.

In a dry process, for example, while the inorganic particles are stirred with a mixer or the like capable of producing a large shearing force, the electron accepting compound or a solution prepared by dissolving the electron accepting compound in an organic solvent is added dropwise or sprayed together with dry air or a nitrogen gas to the inorganic particles in order to deposit the electron accepting compound on the surfaces of the inorganic particles. The addition or spraying of the electron accepting compound may be done at a temperature equal to or lower than the boiling point of the solvent used. Subsequent to the addition or spraying of the electron accepting compound, the resulting inorganic particles may optionally be baked at 100° C. or more. The temperature at which the inorganic particles are baked and the amount of time during which the inorganic particles are baked are not limited; the inorganic particles may be baked under appropriate conditions of temperature and time under which the intended electrophotographic properties are achieved.

In a wet process, for example, while the inorganic particles are dispersed in a solvent with a stirrer, an ultrasonic wave, a sand mill, an Attritor, a ball mill, or the like, the electron accepting compound is added to the dispersion liquid. After the resulting mixture has been stirred or dispersed, the solvent is removed such that the electron accepting compound is deposited on the surfaces of the inorganic particles. The removal of the solvent may be done by, for example, filtration or distillation. Subsequent to the removal of the solvent, the resulting inorganic particles may optionally be baked at 100° C. or more. The temperature at which the inorganic particles are baked and the amount of time during which the inorganic particles are baked are not limited; the inorganic particles may be baked under appropriate conditions of temperature and time under which the intended electrophotographic properties are achieved. In the wet process, moisture contained in the inorganic particles may be removed prior to the addition of the electron accepting compound. The removal of moisture contained in the inorganic particles may be done by, for example, heating the inorganic particles while being stirred in the solvent or by bringing the moisture to the boil together with the solvent.

The deposition of the electron accepting compound may be done prior or subsequent to the surface treatment of the inorganic particles with the surface-treating agent. Alternatively, the deposition of the electron accepting compound and the surface treatment using the surface-treating agent may be performed at the same time.

The content of the electron accepting compound may be, for example, 0.01% by weight or more and 20% by weight or less and is preferably 0.01% by weight or more and 10% by weight or less of the amount of inorganic particles.

Examples of the binder resin included in the undercoat layer include the following known materials: known high-molecular compounds such as an acetal resin (e.g., polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenolic resin, a phenol-formaldehyde resin, a melamine resin, a urethane resin, an alkyd resin, and an epoxy resin; zirconium chelates; titanium chelates; aluminum chelates; titanium alkoxides; organotitanium compounds; and silane coupling agents.

Other examples of the binder resin included in the undercoat layer include charge transporting resins including a charge transporting group and conductive resins such as polyaniline.

Among the above binder resins, a resin insoluble in a solvent included in a coating liquid used for forming a layer on the undercoat layer may be used as a binder resin included in the undercoat layer. In particular, resins produced by reacting at least one resin selected from the group consisting of thermosetting resins (e.g., a urea resin, a phenolic resin, a phenol-formaldehyde resin, a melamine resin, a urethane resin, an unsaturated polyester resin, an alkyd resin, and an epoxy resin), polyamide resins, polyester resins, polyether resins, methacrylic resins, acrylic resins, polyvinyl alcohol resins, and polyvinyl acetal resins with a curing agent may be used.

In the case where two or more types of the above binder resins are used in combination, the mixing ratio may be set appropriately.

The undercoat layer may include various additives in order to enhance electrical properties, environmental stability, and image quality.

Examples of the additives include the following known materials: electron transporting pigments such as polycondensed pigments and azo pigments, zirconium chelates, titanium chelates, aluminum chelates, titanium alkoxides, organotitanium compounds, and silane coupling agents. The silane coupling agents, which are used in the surface treatment of the inorganic particles as described above, may also be added to the undercoat layer as an additive.

Examples of silane coupling agents that may be used as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelates include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelates include tetraisopropyl titanate, tetra-n-butyl titanate, butyl titanate dimer, tetra-(2-ethylhexyl) titanate, titanium acetylacetonate, polytitanium acetylacetonate, titanium octylene glycolate, titanium lactate ammonium salt, titanium lactate, titanium lactate ethyl ester, titanium triethanolaminate, and polyhydroxy titanium stearate.

Examples of the aluminum chelates include aluminum isopropylate, monobutoxy aluminum diisopropylate, aluminum butyrate, diethyl acetoacetate aluminum diisopropylate, and aluminum tris(ethyl acetoacetate).

The above additives may be used alone. Alternatively, two or more types of the above additives may be used in a mixture or in the form of a polycondensate.

The undercoat layer may have a Vickers hardness of 35 or more.

In order to reduce the formation of moiré fringes, the surface roughness (i.e., ten-point-average roughness) of the undercoat layer may be adjusted to $1/(4n)$ to $½$ of the wavelength λ of the laser beam used as exposure light, where n is the refractive index of the layer that is to be formed on the undercoat layer.

Resin particles and the like may be added to the undercoat layer in order to adjust the surface roughness of the undercoat layer. Examples of the resin particles include silicone resin particles and crosslinked polymethyl methacrylate resin particles. The surface of the undercoat layer may be ground in order to adjust the surface roughness of the undercoat layer. For grinding the surface of the undercoat layer, buffing, sand blasting, wet honing, grinding, and the like may be performed.

The method for forming the undercoat layer is not limited, and known methods may be employed. The undercoat layer may be formed by, for example, forming a coating film using a coating liquid prepared by mixing the above-described components with a solvent (hereinafter, this coating liquid is referred to as "undercoat layer forming coating liquid"), drying the coating film, and, as needed, heating the coating film.

Examples of the solvent used for preparing the undercoat layer forming coating liquid include known organic solvents, such as an alcohol solvent, an aromatic hydrocarbon solvent, a halogenated hydrocarbon solvent, a ketone solvent, a ketone alcohol solvent, an ether solvent, and an ester solvent.

Specific examples thereof include the following common organic solvents: methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

For dispersing the inorganic particles in the preparation of the undercoat layer forming coating liquid, for example, known equipment such as a roll mill, a ball mill, a vibrating ball mill, an Attritor, a sand mill, a colloid mill, and a paint shaker may be used.

For coating the conductive support with the undercoat layer forming coating liquid, for example, common methods such as blade coating, wire bar coating, spray coating, dip coating, bead coating, air knife coating, and curtain coating may be employed.

The thickness of the undercoat layer is preferably, for example, 15 μm or more and is more preferably 20 μm or more and 50 μm or less.

Intermediate Layer

Although not illustrated in the drawings, an intermediate layer may optionally be interposed between the undercoat layer and the photosensitive layer.

The intermediate layer includes, for example, a resin. Examples of the resin included in the intermediate layer include the following high-molecular compounds: acetal resins (e.g., polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may include an organometallic compound. Examples of the organometallic compound included in the intermediate layer include organometallic compounds containing a metal atom such as a zirconium atom, a titanium atom, an aluminum atom, a manganese atom, or a silicon atom.

The above compounds included in the intermediate layer may be used alone. Alternatively, two or more types of the above compounds may be used in a mixture or in the form of a polycondensate.

In particular, the intermediate layer may include an organometallic compound containing a zirconium atom or a silicon atom.

The method for forming the intermediate layer is not limited, and known methods may be employed. The intermediate layer may be formed by, for example, forming a coating film using an intermediate layer forming coating liquid prepared by mixing the above-described components with a solvent, drying the coating film, and, as needed, heating the coating film.

For forming the intermediate layer, common coating methods such as dip coating, push coating, wire bar coating, spray coating, blade coating, knife coating, and curtain coating may be employed.

The thickness of the intermediate layer may be, for example, 0.1 μm or more and 3 μm or less. It is possible to use the intermediate layer also as an undercoat layer.

Charge Generation Layer

The charge generation layer includes a charge generating material and the specific copolymer that serves as a binder resin. The charge generation layer may optionally include components other than the charge generating material or the specific copolymer.

Charge Generating Material

Examples of the charge generating material include azo pigments, such as bisazo and trisazo; annulated aromatic pigments, such as dibromoanthanthrone; perylene pigments; pyrrolopyrrole pigments; phthalocyanine pigments; zinc oxide; and trigonal selenium.

Among the above charge generating materials, phthalocyanine pigments may be used since they have high charge generating ability. Examples of phthalocyanine pigments include metal phthalocyanine pigments and metal-free phthalocyanine pigments. Specific examples of phthalocyanine pigments include hydroxygallium phthalocyanine pigments; chlorogallium phthalocyanine pigments; dichlorotin phthalocyanine pigments; and titanyl phthalocyanine pigments.

Among the above phthalocyanine pigments, at least one selected from a hydroxygallium phthalocyanine pigment and a chlorogallium phthalocyanine pigment is preferable and a hydroxygallium phthalocyanine pigment is more preferable in consideration of charge generating ability.

In the case where a phthalocyanine pigment (specifically, at least one of a chlorogallium phthalocyanine and a hydroxygallium phthalocyanine that have particularly higher charge generating ability among phthalocyanine pigments), which has particularly higher charge generating ability among the above charge generating materials, is used, when the charge traps are present in the charge generation layer, the amount of charge carriers accumulated at the charge traps is accordingly increased since the charge generating material has high charge generating ability. This increases the occurrence of positive ghosting. However, in this exemplary embodiment, the charge generation layer includes the specific copolymer that serves as a binder resin as described above. This reduces the amount of charge traps formed in the charge generation layer. Accordingly, it is considered that the occurrence of positive ghosting may be reduced even when a phthalocyanine pigment or, specifically, at least one of a chlorogallium phthalocyanine and a hydroxygallium phthalocyanine is used as a charge generating material.

Among hydroxygallium phthalocyanine pigments, a Type-V hydroxygallium phthalocyanine pigment may be used.

In particular, for example, a hydroxygallium phthalocyanine pigment having a maximum peak wavelength at 810 nm or more and 839 nm or less in an absorption spectrum that covers a wavelength range of 600 nm or more and 900 nm or less may be used in order to achieve further high dispersibility.

The average particle diameter and BET specific surface area of the hydroxygallium phthalocyanine pigment having a maximum peak wavelength at 810 nm or more and 839 nm or less may fall within specific ranges. Specifically, the average particle diameter of the above hydroxygallium phthalocyanine pigment is preferably 0.20 μm or less and is more preferably 0.01 μm or more and 0.15 μm or less. The BET specific surface area of the above hydroxygallium phthalocyanine pigment is preferably 45 $m^2/g$ or more, is more preferably 50 $m^2/g$ or more, and is particularly preferably 55 $m^2/g$ or more and 120 $m^2/g$ or less. The term "average particle diameter" used herein refers to volume-average particle diameter (d50 average particle diameter)

measured by a laser diffraction/scattering particle size distribution analyzer "LA-700" produced by HORIBA, Ltd. The term "BET specific surface area" used herein refers to BET specific surface area measured by nitrogen purging using a BET specific surface area analyzer "FLOWSORB II2300" produced by Shimadzu Corporation.

The maximum particle diameter (i.e., the maximum primary-particle diameter) of the hydroxygallium phthalocyanine pigment is preferably 1.2 μm or less, is more preferably 1.0 μm or less, and is further preferably 0.3 μm or less.

The hydroxygallium phthalocyanine pigment may have an average particle diameter of 0.2 μm or less, a maximum particle diameter of 1.2 μm or less, and a specific surface area of 45 m²/g or more.

The hydroxygallium phthalocyanine pigment may be a Type-V hydroxygallium phthalocyanine pigment having a diffraction peak at, at least, Bragg angles (2θ±0.2°) of 7.3°, 16.0°, 24.9°, and 28.0° in an X-ray diffraction spectrum measured with the CuKα radiation.

The above charge generating materials may be used alone or in combination of two or more.

The amount of the charge generating material may be, for example, 30% by volume or more and 80% by volume or less of the total amount of the charge generation layer. The amount of the charge generating material is preferably 40% by volume or more and 70% by volume or less and is more preferably 50% by volume or more and 60% by volume or less of the total amount of the charge generation layer in order to reduce the occurrence of positive ghosting.

Specific Copolymer

The specific copolymer is a vinyl copolymer that includes the chlorine-containing component, the acyloxy component, and the polycarboxyl component. The proportion of the acyloxy component to all of the above structural units is 13.4 mol % or more and 20.0 mol % or less.

The specific copolymer includes at least the chlorine-containing component, the acyloxy component, and the polycarboxyl component and may optionally include structural units other than the above structural units, such as a structural unit derived from a diol. The proportion of the other structural unit to all of the above structural units is preferably 5 mol % or less, is more preferably 3 mol % or less, and is further preferably 1 mol % or less. It is particularly preferable that the vinyl copolymer do not include the other structural units, that is, the specific copolymer be a copolymer composed only of the chlorine-containing component, the acyloxy component, and the polycarboxyl component.

The amount of the acyloxy component included in the specific copolymer is preferably 13.4 mol % or more and 18.0 mol % or less and is more preferably 14 mol % or more and 17 mol % or less of the total amount of the above structural units in order to reduce the occurrence of positive ghosting.

In this exemplary embodiment, the proportion of each structural unit to all of the structural units is determined by analyzing the specific copolymer by NMR and measuring the amounts of the chlorine component and the carboxyl component.

The amount of polycarboxyl component included in the specific copolymer is preferably 4.0 mol % or more and 7.0 mol % or less, is more preferably 4.5 mol % or more and 6.5 mol % or less, and is further preferably 5.0 mol % or more and 6.0 mol % or less of the amount of acyloxy component in order to reduce the occurrence of positive ghosting.

When the proportion of the polycarboxyl component to the acyloxy component falls within the above range, the occurrence of image defects caused due to positive ghosting may be reduced compared with the cases where the proportion of the polycarboxyl component is larger or smaller than the above range. While the reasons for this are uncertain, it is considered that setting the proportion of the polycarboxyl component to the acyloxy component to fall within the above range enables a suitable interaction between the charge generating material and the vinyl copolymer, which reduces the formation of the charge traps.

The amount of the polycarboxyl component included in the specific copolymer is, for example, 0.5 mol % or more and 1.4 mol % or less and is preferably 0.6 mol % or more and 1.1 mol % or less of the total amount of the above structural units.

Chlorine-Containing Component

As described above, the chlorine-containing component is a structural unit that includes a chlorine atom and does not include either an acyloxy group or two or more carboxyl groups.

The specific copolymer may include only one chlorine-containing component or two or more chlorine-containing components.

The number of chlorine atoms included in the chlorine-containing component is, for example, 1 to 5, is preferably 1 to 3, is more preferably 1 or 2, and is further preferably 1. The chlorine atom may be directly bonded to the straight chain of the chlorine-containing component.

Examples of the other substituent groups that may be included in the chlorine-containing component include an alkyl group, an alkoxy group, and a halogen atom other than a chlorine atom.

The chlorine-containing component may be a structural unit derived from vinyl chloride or a derivative of vinyl chloride.

The chlorine-containing component may be the structural unit represented by General Formula (1) below.

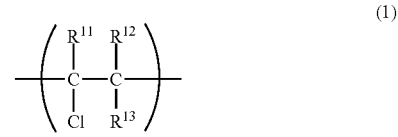

(1)

In General Formula (1), $R^{11}$ to $R^{13}$ each independently represent a hydrogen atom or an alkyl group having 1 to 5 carbon atoms.

In General Formula (1), $R^{11}$ to $R^{13}$ are preferably each independently a hydrogen atom or an alkyl group having 1 to 5 carbon atoms, are more preferably each independently a hydrogen atom or a methyl group, and are further preferably hydrogen atoms.

In General Formula (1), $R^{11}$ to $R^{13}$ may be the same as or different from one another.

In particular, the chlorine-containing component may be a structural unit represented by General Formula (1) in which all of $R^{11}$ to $R^{13}$ are hydrogen atoms.

Acyloxy Component

As described above, the acyloxy component is a structural unit including an acyloxy group.

The specific copolymer may include only one acyloxy component or two or more acyloxy components.

The number of acyloxy groups included in the acyloxy component is, for example, 1 or 2 and is preferably 1. The acyloxy group may be bonded directly to the straight chain of the acyloxy component.

Examples of the other substituent groups that may be included in the acyloxy component include an alkyl group, an alkoxy group, and a halogen atom.

The acyloxy component may be a structural unit derived from vinyl acetate or a derivative of vinyl acetate.

The acyloxy component may be the structural unit represented by General Formula (2) below.

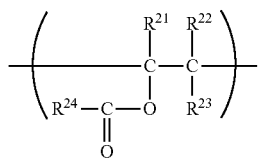
(2)

In General Formula (2), $R^{21}$ to $R^{23}$ each independently represent a hydrogen atom or an alkyl group having 1 to 5 carbon atoms, and $R^{24}$ represents an alkyl group having 1 to 5 carbon atoms.

In General Formula (2), $R^{21}$ to $R^{23}$ are preferably each independently a hydrogen atom or an alkyl group having 1 to 5 carbon atoms, are more preferably each independently a hydrogen atom or a methyl group, and are further preferably hydrogen atoms.

In General Formula (2), $R^{21}$ to $R^{23}$ may be the same as or different from one another. In particular, it is preferable that all of $R^{21}$ to $R^{23}$ in General Formula (2) be hydrogen atoms.

In General Formula (2), $R^{24}$ is preferably an alkyl group having 1 to 5 carbon atoms, is more preferably a methyl group or an ethyl group, and is further preferably a methyl group.

In particular, the acyloxy component may be a structural unit represented by General Formula (2) in which all of $R^{21}$ to $R^{23}$ are hydrogen atoms and $R^{24}$ is a methyl group.

Polycarboxyl Component

As described above, the polycarboxyl component is a structural unit that includes two or more carboxyl groups and does not include an acyloxy group.

The specific copolymer may include only one polycarboxyl component or two or more polycarboxyl components.

The number of carboxyl groups included in the polycarboxyl component is, for example, 2 to 4, is preferably 2 or 3, and is more preferably 2. The two or more carboxyl groups may be bonded directly to the straight chain of the polycarboxyl component.

Examples of the other substituent groups that may be included in the polycarboxyl component include an alkyl group, an alkoxy group, and a halogen atom.

The polycarboxyl component may be a structural unit derived from an unsaturated dicarboxylic acid or an anhydride of an unsaturated dicarboxylic acid. Examples of the unsaturated dicarboxylic acid include maleic acid, fumaric acid, citraconic acid, mesaconic acid, 2-pentenedioic acid, methylenesuccinic acid, 2-allylmalonic acid, and isopropylidenesuccinic acid.

The polycarboxyl component may be the structural unit represented by General Formula (3) below.

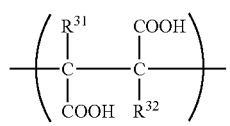
(3)

In General Formula (3), $R^{31}$ and $R^{32}$ each independently represent a hydrogen atom or an alkyl group having 1 to 5 carbon atoms.

In General Formula (3), $R^{31}$ and $R^{32}$ are preferably each independently a hydrogen atom or an alkyl group having 1 to 5 carbon atoms, are more preferably each independently a hydrogen atom or a methyl group, and are further preferably hydrogen atoms.

In General Formula (3), $R^{31}$ and $R^{32}$ may be the same as or different from each other.

In particular, the polycarboxyl component may be a structural unit represented by General Formula (3) in which both of $R^{31}$ and $R^{32}$ are hydrogen atoms.

The specific copolymer is preferably a copolymer that includes the structural unit represented by General Formula (1), the structural unit represented by General Formula (2), and the structural unit represented by General Formula (3).

The specific copolymer is more preferably a copolymer that includes a structural unit represented by General Formula (1) in which all of $R^{11}$ to $R^{13}$ are hydrogen atoms, a structural unit represented by General Formula (2) in which all of $R^{21}$ to $R^{23}$ are hydrogen atoms and $R^{24}$ is a methyl group, and a structural unit represented by General Formula (3) in which both of $R^{31}$ and $R^{32}$ are hydrogen atoms.

The method for producing the specific copolymer is not limited. The specific copolymer may be produced by, for example, suspension polymerization of monomers that correspond to the respective structural units.

The method for forming the charge generation layer is not limited. Any known method may be employed. The charge generation layer may be formed by, for example, forming a coating film using a coating liquid prepared by mixing the above-described components with a solvent (hereinafter, this coating liquid is referred to as "charge generation layer forming coating liquid"), drying the coating film, and, as needed, heating the coating film.

Examples of the solvent used for preparing the charge generation layer forming coating liquid include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. The above solvents may be used alone or in a mixture of two or more.

For dispersing particles of the charge generating material or the like in the charge generation layer forming coating liquid, for example, media dispersing machines, such as a ball mill, a vibrating ball mill, an Attritor, a sand mill, and a horizontal sand mill; and medialess dispersing machines, such as a stirrer, an ultrasonic wave disperser, a roll mill, and a high-pressure homogenizer, may be used. Specific examples of the high-pressure homogenizer include an impact-type homogenizer in which a dispersion liquid is brought into collision with a liquid or a wall under a high pressure in order to perform dispersion and a through-type homogenizer in which a dispersion liquid is passed through a very thin channel under a high pressure in order to perform dispersion.

The average diameter of the particles of the charge generating material dispersed in the charge generation layer forming coating liquid may be 0.5 µm or less, is preferably 0.3 µm or less, and is further preferably 0.15 µm or less.

For applying the charge generation layer forming coating liquid to the undercoat layer (or, the intermediate layer), for example, common coating methods such as blade coating, wire bar coating, spray coating, dip coating, bead coating, air knife coating, and curtain coating may be employed.

The thickness of the charge generation layer is, for example, preferably 0.05 µm or more and 5.0 µm or less, is more preferably 0.1 µm or more and 2.0 µm or less, is further preferably 0.1 µm or more and 1.0 µm or less, and is particularly preferably 0.1 µm or more and 0.5 µm or less.

Charge Transport Layer

The charge transport layer includes, for example, a charge transporting material and a binder resin. The charge transport layer may be a layer including a high-molecular charge transporting material.

Examples of the charge transporting material include, but are not limited to, the following electron transporting compounds: quinones, such as p-benzoquinone, chloranil, bromanil, and anthraquinone; tetracyanoquinodimethane compounds; fluorenones, such as 2,4,7-trinitrofluorenone; xanthones; benzophenones; cyanovinyl compounds; and ethylenes. Examples of the charge transporting material further include hole transporting compounds such as triarylamines, benzidines, arylalkanes, aryl-substituted ethylenes, stilbenes, anthracenes, and hydrazones. The above charge transporting materials may be used alone or in combination of two or more.

The charge transporting material may be selected from the following compounds in consideration of charge mobility: the triarylamine charge transporting material represented by General Formula (a-1) below (hereinafter, referred to as "triarylamine charge transporting material (a-1)"); and the charge transporting material represented by General Formula (CT1) below (hereinafter, referred to as "butadiene charge transporting material (CT1)") and the charge transporting material represented by General Formula (CT2) below (hereinafter, referred to as "benzidine charge transporting material (CT2)"), which are examples of the triarylamine charge transporting material.

The butadiene charge transporting material (CT1) and the benzidine charge transporting material (CT2) may be used in combination with each other as a charge transporting material.

The triarylamine charge transporting material (a-1) is described below.

The triarylamine charge transporting material (a-1) is the charge transporting material represented by General Formula (a-1) below.

In General Formula (a-1), $Ar^{T1}$, $Ar^{T2}$, and $Ar^{T3}$ each independently represent an aryl group, a substituted aryl group, a —$C_6H_4$—$C(R^{T4})$=$C(R^{T5})(R^{T6})$ group, or a —$C_6H_4$—CH=CH—CH=$C(R^{T7})$ ($R^{T8}$) group, where $R^{T4}$, $R^{T5}$, $R^{T6}$, $R^{T7}$, and $R^{T8}$ each independently represent a hydrogen atom, an alkyl group, a substituted alkyl group, an aryl group, or a substituted aryl group.

Examples of a substituent group included in the above substituted groups include a halogen atom, an alkyl group having 1 to 5 carbon atoms, an alkoxy group having 1 to 5 carbon atoms, and an amino group substituted with an alkyl group having 1 to 3 carbon atoms.

The butadiene charge transporting material (CT1) is described below.

The butadiene charge transporting material (CT1) is the charge transporting material represented by General Formula (CT1) below.

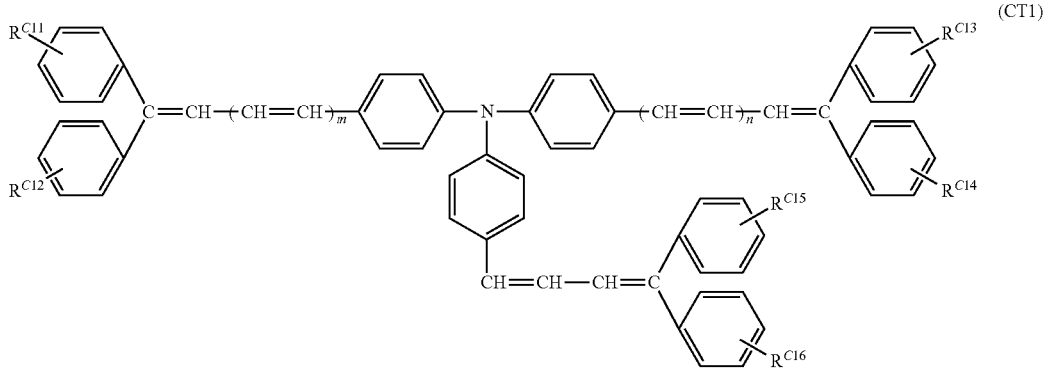

In General Formula (CT1), $R^{C11}$, $R^{C12}$, $R^{C13}$, $R^{C14}$, $R^{C15}$, and $R^{C16}$ each independently represent a hydrogen atom, a halogen atom, an alkyl group including 1 to 20 carbon atoms, an alkoxy group including 1 to 20 carbon atoms, or an aryl group including 6 to 30 carbon atoms; a pair of adjacent substituent groups may be bonded to each other to form a hydrocarbon ring structure; and n and m each independently represent 0, 1, or 2.

Examples of the halogen atom represented by $R^{C11}$, $R^{C12}$, $R^{C13}$, $R^{C14}$, $R^{C15}$, and $R^{C16}$ in General Formula (CT1) include a fluorine atom, a chlorine atom, a bromine atom, and an iodine atom. Among the above halogen atoms, a fluorine atom and a chlorine atom are preferable, and a chlorine atom is more preferable.

Examples of the alkyl group represented by $R^{C11}$, $R^{C12}$, $R^{C13}$, $R^{C14}$, $R^{C15}$, and $R^{C16}$ in General Formula (CT1) include linear and branched alkyl groups having 1 to 20 carbon atoms, preferably 1 to 6 carbon atoms, and more preferably 1 to 4 carbon atoms.

Specific examples of the linear alkyl group include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

Specific examples of the branched alkyl group include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isoundecyl group, a sec-undecyl group, a tert-undecyl group, a neoundecyl group, an isododecyl group, a sec-dodecyl group, a tert-dodecyl group, a neododecyl group, an isotridecyl group, a sec-tridecyl group, a tert-tridecyl group, a neotridecyl group, an isotetradecyl group, a sec-tetradecyl group, a tert-tetradecyl group, a neotetradecyl group, a 1-isobutyl-4-ethyloctyl group, an isopentadecyl group, a sec-pentadecyl group, a tert-pentadecyl group, a neopentadecyl group, an isohexadecyl group, a sec-hexadecyl group, a tert-hexadecyl group, a neohexadecyl group, a 1-methylpentadecyl group, an isoheptadecyl group, a sec-heptadecyl group, a tert-heptadecyl group, a neoheptadecyl group, an isooctadecyl group, a sec-octadecyl group, a tert-octadecyl group, a neooctadecyl group, an isononadecyl group, a sec-nonadecyl group, a tert-nonadecyl group, a neononadecyl group, a 1-methyloctyl group, an isoicosyl group, a sec-icosyl group, a tert-icosyl group, and a neoicosyl group.

Among the above alkyl groups, in particular, lower alkyl groups such as a methyl group, an ethyl group, and an isopropyl group may be used.

Examples of the alkoxy group represented by $R^{C11}$, $R^{C12}$, $R^{C13}$, $R^{C14}$, $R^{C15}$, and $R^{C16}$ in General Formula (CT1) include linear and branched alkoxy groups having 1 to 20 carbon atoms, preferably 1 to 6 carbon atoms, and more preferably 1 to 4 carbon atoms.

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and an n-icosyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, a tert-decyloxy group, an isoundecyloxy group, a sec-undecyloxy group, a tert-undecyloxy group, a neoundecyloxy group, an isododecyloxy group, a sec-dodecyloxy group, a tert-dodecyloxy group, a neododecyloxy group, an isotridecyloxy group, a sec-tridecyloxy group, a tert-tridecyloxy group, a neotridecyloxy group, an isotetradecyloxy group, a sec-tetradecyloxy group, a tert-tetradecyloxy group, a neotetradecyloxy group, a 1-isobutyl-4-ethyloctyloxy group, an isopentadecyloxy group, a sec-pentadecyloxy group, a tert-pentadecyloxy group, a neopentadecyloxy group, an isohexadecyloxy group, a sec-hexadecyloxy group, a tert-hexadecyloxy group, a neohexadecyloxy group, a 1-methylpentadecyloxy group, an isoheptadecyloxy group, a sec-heptadecyloxy group, a tert-heptadecyloxy group, a neoheptadecyloxy group, an isooctadecyloxy group, a sec-octadecyloxy group, a tert-octadecyloxy group, a neooctadecyloxy group, an isononadecyloxy group, a sec-nonadecyloxy group, a tert-nonadecyloxy group, a neononadecyloxy group, a 1-methyloctyloxy group, an isoicosyloxy group, a sec-icosyloxy group, a tert-icosyloxy group, and a neoicosyloxy group.

Among the above alkoxy groups, in particular, a methoxy group may be used.

Examples of the aryl group represented by $R^{C11}$, $R^{C12}$, $R^{C13}$, $R^{C14}$, $R^{C15}$, and $R^{C16}$ in General Formula (CT1) include aryl groups having 6 to 30 carbon atoms, preferably 6 to 20 carbon atoms, and more preferably 6 to 16 carbon atoms.

Specific examples of such aryl groups include a phenyl group, a naphthyl group, a phenanthryl group, and a biphenylyl group.

Among the above aryl groups, in particular, a phenyl group and a naphthyl group may be used.

The substituent groups represented by $R^{C11}$, $R^{C12}$, $R^{C13}$, $R^{C14}$, $R^{C15}$, and $R^{C16}$ in General Formula (CT1) may further include a substituent subgroup. Examples of the substituent subgroup include the atoms and groups described above as examples, such as a halogen atom, an alkyl group, an alkoxy group, and an aryl group.

Examples of a group with which a pair of adjacent substituent groups selected from $R^{C11}$, $R^{C12}$, $R^{C13}$, $R^{C14}$, $R^{C15}$, and $R^{C16}$ in General Formula (CT1), that is, for example, the pair of $R^{C11}$ and $R^{C12}$, the pair of $R^{C13}$ and $R^{C14}$, or the pair of $R^{C15}$ and $R^{C16}$, are bonded to each other to form a hydrocarbon ring structure include a single bond, a 2,2'-methylene group, a 2,2'-ethylene group, and a 2,2'-vinylene group. In particular, a single bond and a 2,2'-methylene group may be used.

Specific examples of the hydrocarbon ring structure include a cycloalkane structure, a cycloalkene structure, and a cycloalkane polyene structure.

In General Formula (CT1), n and m may be 1.

It is preferable that, in General Formula (CT1), $R^{C11}$, $R^{C12}$, $R^{C13}$, $R^{C14}$, $R^{C15}$, and $R^{C16}$ represent a hydrogen atom, an alkyl group having 1 to 20 carbon atoms, or an alkoxy group having 1 to 20 carbon atoms and that m and n represent 1 or 2 in order to form a photosensitive layer having high charge transportability, that is, a charge transport layer. It is more preferable that $R^{C11}$, $R^{C12}$, $R^{C13}$, $R^{C14}$, $R^{C15}$, and $R^{C16}$ represent a hydrogen atom and that m and n represent 1.

In other words, it is more preferable that the butadiene charge transporting material (CT1) be the charge transporting material represented by Structural Formula (CT1A) below, which is the exemplified compound (CT1-3).

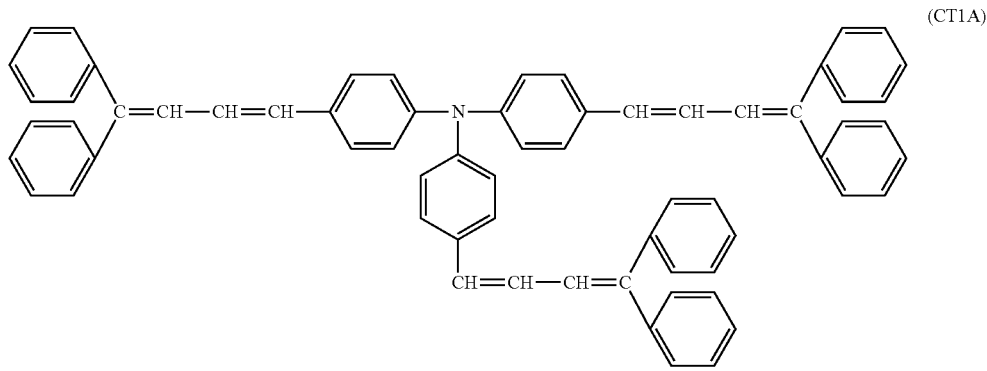 [SMILES: C(=Cc1ccc(N(c2ccc(C=CC=C(c3ccccc3)c3ccccc3)cc2)c2ccc(C=CC=C(c3ccccc3)c3ccccc3)cc2)cc1)C=C(c1ccccc1)c1ccccc1]
(CT1A)

Specific examples of the butadiene charge transporting material (CT1) include, but are not limited to, the following compounds.

| Exemplified compound No. | m | n | $R^{C11}$ | $R^{C12}$ | $R^{C13}$ | $R^{C14}$ | $R^{C15}$ | $R^{C16}$ |
|---|---|---|---|---|---|---|---|---|
| CT1-1 | 1 | 1 | 4-CH$_3$ | 4-CH$_3$ | 4-CH$_3$ | 4-CH$_3$ | H | H |
| CT1-2 | 2 | 2 | H | H | H | H | 4-CH$_3$ | 4-CH$_3$ |
| CT1-3 | 1 | 1 | H | H | H | H | H | H |
| CT1-4 | 2 | 2 | H | H | H | H | H | H |
| CT1-5 | 1 | 1 | 4-CH$_3$ | 4-CH$_3$ | 4-CH$_3$ | H | H | H |
| CT1-6 | 0 | 1 | H | H | H | H | H | H |
| CT1-7 | 0 | 1 | 4-CH$_3$ | 4-CH$_3$ | 4-CH$_3$ | 4-CH$_3$ | 4-CH$_3$ | 4-CH$_3$ |
| CT1-8 | 0 | 1 | 4-CH$_3$ | 4-CH$_3$ | H | H | 4-CH$_3$ | 4-CH$_3$ |
| CT1-9 | 0 | 1 | H | H | 4-CH$_3$ | 4-CH$_3$ | H | H |
| CT1-10 | 0 | 1 | H | H | 3-CH$_3$ | 3-CH$_3$ | H | H |
| CT1-11 | 0 | 1 | 4-CH$_3$ | H | H | H | 4-CH$_3$ | H |
| CT1-12 | 0 | 1 | 4-OCH$_3$ | H | H | H | 4-OCH$_3$ | H |
| CT1-13 | 0 | 1 | H | H | 4-OCH$_3$ | 4-OCH$_3$ | H | H |
| CT1-14 | 0 | 1 | 4-OCH$_3$ | H | 4-OCH$_3$ | H | 4-OCH$_3$ | 4-OCH$_3$ |
| CT1-15 | 0 | 1 | 3-CH$_3$ | H | 3-CH$_3$ | H | 3-CH$_3$ | H |
| CT1-16 | 1 | 1 | 4-CH$_3$ | 4-CH$_3$ | 4-CH$_3$ | 4-CH$_3$ | 4-CH$_3$ | 4-CH$_3$ |
| CT1-17 | 1 | 1 | 4-CH$_3$ | 4-CH$_3$ | H | H | 4-CH$_3$ | 4-CH$_3$ |
| CT1-18 | 1 | 1 | H | H | 4-CH$_3$ | 4-CH$_3$ | H | H |
| CT1-19 | 1 | 1 | H | H | 3-CH$_3$ | 3-CH$_3$ | H | H |
| CT1-20 | 1 | 1 | 4-CH$_3$ | H | H | H | 4-CH$_3$ | H |
| CT1-21 | 1 | 1 | 4-OCH$_3$ | H | H | H | 4-OCH$_3$ | H |
| CT1-22 | 1 | 1 | H | H | 4-OCH$_3$ | 4-OCH$_3$ | H | H |
| CT1-23 | 1 | 1 | 4-OCH$_3$ | H | 4-OCH$_3$ | H | 4-OCH$_3$ | 4-OCH$_3$ |
| CT1-24 | 1 | 1 | 3-CH$_3$ | H | 3-CH$_3$ | H | 3-CH$_3$ | H |

The abbreviations used for describing the above exemplified compounds stand for the following. The numbers attached to the substituent groups each refer to the position at which the substituent group is bonded to a benzene ring.

CH$_3$: Methyl group

OCH$_3$: Methoxy group

Only one type of the butadiene charge transporting material (CT1) may be used alone. Alternatively, two or more types of the butadiene charge transporting materials (CT1) may be used in combination.

The benzidine charge transporting material (CT2) is described below.

The benzidine charge transporting material (CT2) is the charge transporting material represented by General Formula (CT2) below.

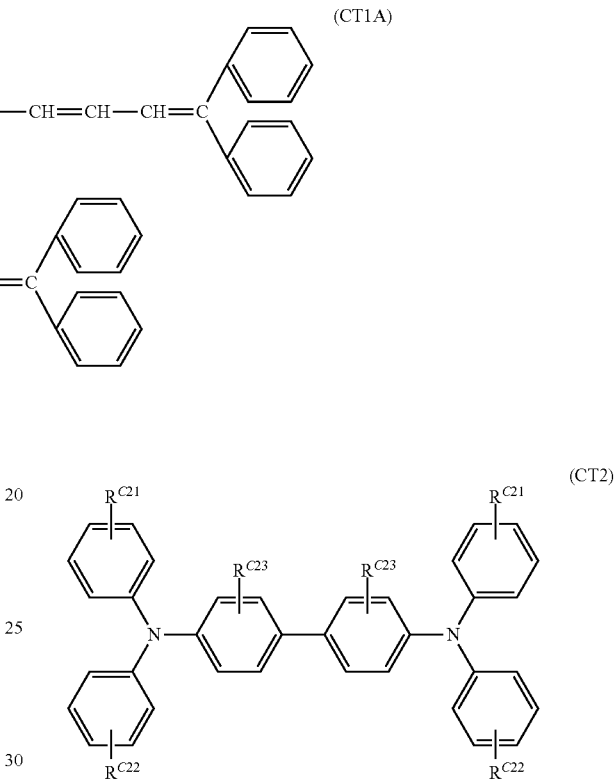
(CT2)

In General Formula (CT2), $R^{C21}$, $R^{C22}$, and $R^{C23}$ each independently represent a hydrogen atom, a halogen atom, an alkyl group having 1 to 10 carbon atoms, an alkoxy group having 1 to 10 carbon atoms, or an aryl group having 6 to 10 carbon atoms.

Examples of the halogen atom represented by $R^{C21}$, $R^{C22}$, and $R^{C23}$ in General Formula (CT2) include a fluorine atom, a chlorine atom, a bromine atom, and an iodine atom. Among the above halogen atoms, a fluorine atom and a chlorine atom are preferable, and a chlorine atom is more preferable.

Examples of the alkyl group represented by $R^{C21}$, $R^{C22}$ and $R^{C23}$ in General Formula (CT2) include linear and branched alkyl groups having 1 to 10 carbon atoms, preferably 1 to 6 carbon atoms, and more preferably 1 to 4 carbon atoms.

Specific examples of the linear alkyl group include a methyl group, an ethyl group, an n-propyl group, an n-butyl group, an n-pentyl group, an n-hexyl group, an n-heptyl group, an n-octyl group, an n-nonyl group, and an n-decyl group.

Specific examples of the branched alkyl group include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, an sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Among the above alkyl groups, in particular, lower alkyl groups such as a methyl group, an ethyl group, and an isopropyl group may be used.

Examples of the alkoxy group represented by $R^{C21}$, $R^{C22}$, and $R^{C23}$ in General Formula (CT2) include linear and branched alkoxy groups having 1 to 10 carbon atoms, preferably 1 to 6 carbon atoms, and more preferably 1 to 4 carbon atoms.

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, and an n-decyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, and a tert-decyloxy group.

Among the above alkoxy groups, in particular, a methoxy group may be used.

Examples of the aryl group represented by $R^{C21}$, $R^{C22}$, and $R^{C23}$ in General Formula (CT2) include aryl groups having 6 to 10 carbon atoms, preferably 6 to 9 carbon atoms, and more preferably 6 to 8 carbon atoms.

Specific examples of the aryl groups include a phenyl group and a naphthyl group.

Among the above aryl groups, in particular, a phenyl group may be used.

The substituent groups represented by $R^{C21}$, $R^{C22}$, and $R^{C23}$ in General Formula (CT2) may further include a substituent subgroup. Examples of the substituent subgroup include the atoms and groups described above as examples, such as a halogen atom, an alkyl group, an alkoxy group, and an aryl group.

In General Formula (CT2), it is preferable that $R^{C21}$, $R^{C22}$, and $R^{C23}$ each independently represent a hydrogen atom or an alkyl group including 1 to 10 carbon atoms. It is more preferable that $R^{C21}$ and $R^{C23}$ represent a hydrogen atom and $R^{C22}$ represent an alkyl group including 1 to 10 carbon atoms (in particular, a methyl group) in order to form a photosensitive layer (i.e., a charge transport layer) having high charge transportability.

Specifically, it is particularly preferable that the benzidine charge transporting material (CT2) be the charge transporting material represented by Structural Formula (CT2A) below, which is the exemplified compound (CT2-2).

(CT2A)

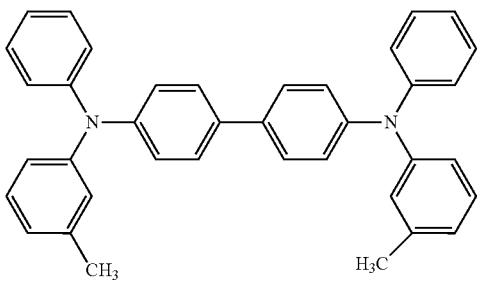

Specific examples of the benzidine charge transporting material (CT2) include, but are not limited to, the following compounds.

| Exemplified compound No. | $R^{C21}$ | $R^{C22}$ | $R^{C23}$ |
|---|---|---|---|
| CT2-1 | H | H | H |
| CT2-2 | H | 3-CH$_3$ | H |
| CT2-3 | H | 4-CH$_3$ | H |
| CT2-4 | H | 3-C$_2$H$_5$ | H |
| CT2-5 | H | 4-C$_2$H$_5$ | H |
| CT2-6 | H | 3-OCH$_3$ | H |
| CT2-7 | H | 4-OCH$_3$ | H |
| CT2-8 | H | 3-OC$_2$H$_5$ | H |
| CT2-9 | H | 4-OC$_2$H$_5$ | H |
| CT2-10 | 3-CH$_3$ | 3-CH$_3$ | H |
| CT2-11 | 4-CH$_3$ | 4-CH$_3$ | H |
| CT2-12 | 3-C$_2$H$_5$ | 3-C$_2$H$_5$ | H |
| CT2-13 | 4-C$_2$H$_5$ | 4-C$_2$H$_5$ | H |
| CT2-14 | H | H | 2-CH$_3$ |
| CT2-15 | H | H | 3-CH$_3$ |
| CT2-16 | H | 3-CH$_3$ | 2-CH$_3$ |
| CT2-17 | H | 3-CH$_3$ | 3-CH$_3$ |
| CT2-18 | H | 4-CH$_3$ | 2-CH$_3$ |
| CT2-19 | H | 4-CH$_3$ | 3-CH$_3$ |
| CT2-20 | 3-CH$_3$ | 3-CH$_3$ | 2-CH$_3$ |
| CT2-21 | 3-CH$_3$ | 3-CH$_3$ | 3-CH$_3$ |
| CT2-22 | 4-CH$_3$ | 4-CH$_3$ | 2-CH$_3$ |
| CT2-23 | 4-CH$_3$ | 4-CH$_3$ | 3-CH$_3$ |

The abbreviations used for describing the above exemplified compounds stand for the following. The numbers attached to the substituent groups each refer to the position at which the substituent group is bonded to a benzene ring.

CH$_3$: Methyl group
C$_2$H$_5$: Ethyl group
OCH$_3$: Methoxy group
OC$_2$H$_5$: Ethoxy group Only one type of the benzidine charge transporting material (CT2) may be used alone. Alternatively, two or more types of the benzidine charge transporting materials (CT2) may be used in combination.

The high-molecular charge transporting material may be any known charge transporting material, such as poly-N-vinylcarbazole or polysilane. In particular, a polyester high-molecular charge transporting material may be used. The above high-molecular charge transporting materials may be used alone or in combination with the above binder resins.

Examples of the binder resin included in the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among the above binder resins, in particular, a polycarbonate resin and a polyarylate resin may be used. The above binder resins may be used alone or in combination of two or more.

The ratio of the amounts of the charge transporting material and the binder resin included in the charge transport layer may be 10:1 to 1:5 by weight.

The charge transport layer may optionally include known additives.

The method for forming the charge transport layer is not limited, and any known method may be employed. The charge transport layer may be formed by, for example, forming a coating film using a coating liquid prepared by mixing the above-described components with a solvent (hereinafter, this coating liquid is referred to as "charge transport layer forming coating liquid"), drying the coating film, and, as needed, heating the coating film.

Examples of the solvent used for preparing the charge transport layer forming coating liquid include the following common organic solvents: aromatic hydrocarbons, such as benzene, toluene, xylene, and chlorobenzene; ketones, such as acetone and 2-butanone; halogenated aliphatic hydrocarbons, such as methylene chloride, chloroform, and ethylene chloride; and cyclic and linear ethers, such as tetrahydrofuran and ethyl ether. The above solvents may be used alone or in a mixture of two or more.

For applying the charge transport layer forming coating liquid onto the surface of the charge generation layer, for example, the following common coating methods may be used: blade coating, wire bar coating, spray coating, dip coating, bead coating, air knife coating, and curtain coating.

The thickness of the charge transport layer is, for example, preferably 5 µm or more and 50 µm or less, is more preferably 10 µm or more and 45 µm or less, and is further preferably 20 µm or more and 42 µm or less.

Protective Layer

A protective layer may optionally be disposed on the photosensitive layer. The protective layer is provided in order to, for example, reduce the chemical change of the photosensitive layer which may occur during charging and increase the mechanical strength of the photosensitive layer.

Therefore, the protective layer may be a layer composed of a cured film (i.e., a crosslinked film). Examples of such a layer include the layers described in 1) and 2) below.

1) A layer composed of a film formed by curing a composition including a reactive group-containing charge transporting material that includes a reactive group and a charge transporting skeleton in the same molecule, that is, a layer including a polymer or a crosslinked product of the reactive group-containing charge transporting material.

2) A layer composed of a film formed by curing a composition including a nonreactive charge transporting material and a reactive group-containing non-charge-transporting material that does not include a charge transporting skeleton and includes a reactive group, that is, a layer including a polymer or a crosslinked product of the nonreactive charge transporting material with the reactive group-containing non-charge-transporting material.

Examples of the reactive group included in the reactive group-containing charge transporting material include the following known reactive groups: a chain-polymerization group; an epoxy group; a —OH group; a —OR group, where R is an alkyl group; a —NH$_2$ group; a —SH group; a —COOH group; and a —SiR$^{Q1}_{3-Qn}$(OR$^{Q2}$)$_{Qn}$ group, where R$^{Q1}$ represents a hydrogen atom, an alkyl group, an aryl group, or a substituted aryl group, R$^{Q2}$ represents a hydrogen atom, an alkyl group, or a trialkylsilyl group, and Qn is an integer of 1 to 3.

The chain-polymerization group is not limited, and may be any functional group capable of inducing radical polymerization. Examples of the chain-polymerization group include functional groups including at least a carbon double bond. Specific examples of the chain-polymerization group include functional groups including at least one selected from a vinyl group, a vinyl ether group, a vinylthioether group, a vinylphenyl group, an acryloyl group, a methacryloyl group, and derivatives of the above groups. In particular, a chain-polymerization group including at least one selected from a vinyl group, a vinylphenyl group, an acryloyl group, a methacryloyl group, and derivatives of the above groups may be used, because such a chain-polymerization group has high reactivity.

The charge transporting skeleton of the reactive group-containing charge transporting material is not limited and may be any charge transporting skeleton having a structure known in the field of electrophotographic photoreceptors. Examples of such a charge transporting skeleton include skeletons that are derived from nitrogen-containing hole transporting compounds, such as triarylamines, benzidines, and hydrazones and conjugated with a nitrogen atom. Among such skeletons, in particular, a triarylamine skeleton may be used.

The above-described reactive group-containing charge transporting material that includes the reactive group and the charge transporting skeleton, the nonreactive charge transporting material, and the reactive group-containing non-charge-transporting material may be selected from known materials.

The protective layer may optionally include known additives.

The method for forming the protective layer is not limited, and known methods may be used. The protective layer may be formed by, for example, forming a coating film using a coating liquid prepared by mixing the above-described components in a solvent (hereinafter, this coating liquid is referred to as "protective layer forming coating liquid"), drying the coating film, and, as needed, curing the coating film by heating or the like.

Examples of the solvent used for preparing the protective layer forming coating liquid include aromatic solvents, such as toluene and xylene; ketone solvents, such as methyl ethyl ketone, methyl isobutyl ketone, and cyclohexanone; ester solvents, such as ethyl acetate and butyl acetate; ether solvents, such as tetrahydrofuran and dioxane; cellosolve solvents, such as ethylene glycol monomethyl ether; and alcohol solvents, such as isopropyl alcohol and butanol. The above solvents may be used alone or in a mixture of two or more.

The protective layer forming coating liquid may be prepared without using a solvent.

For applying the protective layer forming coating liquid on the photosensitive layer (e.g., the charge transport layer), for example, the following common methods may be used: dip coating, push coating, wire bar coating, spray coating, blade coating, knife coating, and curtain coating.

The thickness of the protective layer is preferably, for example, 1 µm or more and 20 µm or less and is more preferably 2 µm or more and 10 µm or less.

Image Forming Apparatus and Process Cartridge

An image forming apparatus according to this exemplary embodiment includes an electrophotographic photoreceptor; a charging unit that charges the surface of the electrophotographic photoreceptor; a unit that forms an electrostatic latent image on the charged surface of the electrophotographic photoreceptor (hereinafter, this unit is referred to as "electrostatic latent image forming unit"); a developing unit that develops the electrostatic latent image formed on the surface of the electrophotographic photoreceptor with a developer including a toner in order to form a toner image; and a transfer unit that transfers the toner image onto the surface of a recording medium. The electrophotographic photoreceptor is the electrophotographic photoreceptor according to the above-described exemplary embodiment.

The image forming apparatus according to this exemplary embodiment may be implemented as any of the following known image forming apparatuses: an image forming apparatus that includes a fixing unit that fixes the toner image transferred on the surface of the recording medium; a direct-transfer image forming apparatus that directly transfers a toner image formed on the surface of the electrophotographic photoreceptor onto the surface of a recording medium; an intermediate-transfer image forming apparatus that transfers a toner image formed on the surface of the electrophotographic photoreceptor onto the surface of an intermediate transfer body (this process is referred to as "first transfer") and further transfers the toner image transferred on the surface of the intermediate transfer body onto the surface of a recording medium (this process is referred to as "second transfer"); an image forming apparatus that includes a cleaning unit that cleans the surface of the electrophotographic photoreceptor after the toner image has been transferred and before the electrophotographic photoreceptor is charged; an image forming apparatus that includes a charge-eliminating unit that irradiates, with charge-elimination light, the surface of the electrophotographic photoreceptor after the toner image has been transferred and before the electrophotographic photoreceptor is charged in order to eliminate charge; and an image forming apparatus that includes an electrophotographic photoreceptor heating member that heats the electrophotographic photoreceptor in order to lower the relative temperature.

In the intermediate-transfer image forming apparatus, the transfer unit includes, for example, an intermediate transfer body onto which a toner image is transferred, a first transfer unit that transfers a toner image formed on the surface of the electrophotographic photoreceptor onto the surface of the intermediate transfer body (first transfer), and a second transfer unit that transfers the toner image transferred on the surface of the intermediate transfer body onto the surface of a recording medium (second transfer).

The image forming apparatus according to this exemplary embodiment may be either a dry-developing image forming apparatus or a wet-developing image forming apparatus in which a liquid developer is used for developing images.

In the image forming apparatus according to this exemplary embodiment, for example, a portion including the electrophotographic photoreceptor may have a cartridge structure, that is, may be a process cartridge, which is detachably attachable to the image forming apparatus. The process cartridge may include, for example, the electrophotographic photoreceptor according to the above-described exemplary embodiment. The process cartridge may further include, for example, at least one component selected from the group consisting of the charging unit, the electrostatic latent image forming unit, the developing unit, and the transfer unit.

An example of the image forming apparatus according to this exemplary embodiment is described below. However, the image forming apparatus is not limited to this. Hereinafter, only the components illustrated in the drawings are described, and the descriptions of the other components are omitted.

Figure 2:
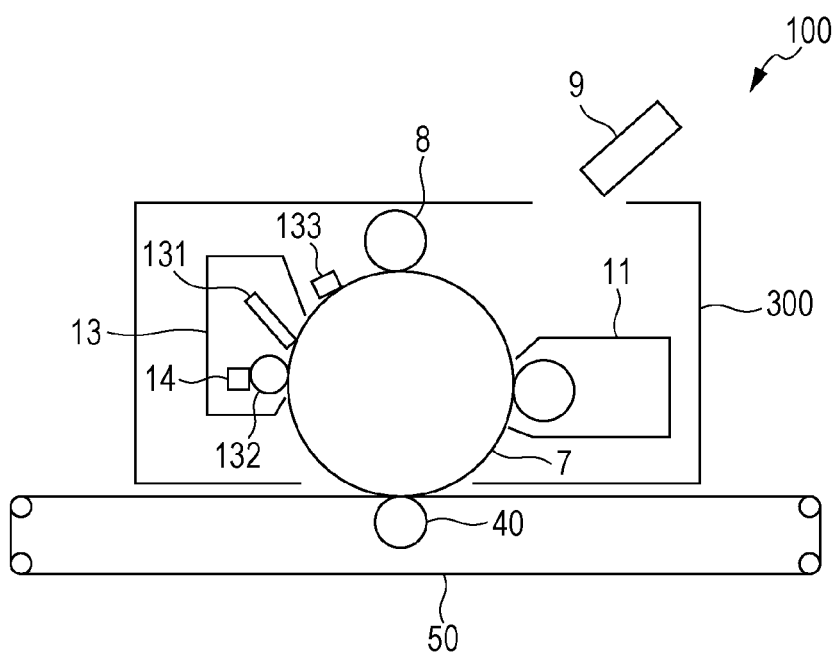
FIG. 2 is a schematic diagram illustrating an example of an image forming apparatus according to an exemplary embodiment.

FIG. 2 schematically illustrates an example of the image forming apparatus according to this exemplary embodiment.

As illustrated in FIG. 2, an image forming apparatus 100 according to this exemplary embodiment includes a process cartridge 300 including an electrophotographic photoreceptor 7, an exposure device 9 (an example of the electrostatic latent image forming unit), a transfer device 40 (i.e., a first transfer device), and an intermediate transfer body 50. In the image forming apparatus 100, the exposure device 9 is arranged such that the electrophotographic photoreceptor 7 is exposed to light emitted by the exposure device 9 through an aperture formed in the process cartridge 300; the transfer device 40 is arranged to face the electrophotographic photoreceptor 7 across the intermediate transfer body 50; and the intermediate transfer body 50 is arranged such that a part of the intermediate transfer body 50 comes into contact with the electrophotographic photoreceptor 7. Although not illustrated in FIG. 2, the image forming apparatus 100 also includes a second transfer device that transfers a toner image transferred on the intermediate transfer body 50 onto a recording medium, such as paper. The intermediate transfer body 50, the transfer device 40 (i.e., a first transfer device), and the second transfer device (not illustrated) correspond to an example of the transfer unit.

The process cartridge 300 illustrated in FIG. 2 includes the electrophotographic photoreceptor 7, a charging device 8 (an example of the charging unit), a developing device 11 (an example of the developing unit), and a cleaning device 13 (an example of the cleaning unit), which are integrally supported inside a housing. The cleaning device 13 includes a cleaning blade 131 (an example of the cleaning member), which is arranged to come into contact with the surface of the electrophotographic photoreceptor 7. The cleaning member is not limited to the cleaning blade 131 and may be a conductive or insulative fibrous member. The conductive or insulative fibrous member may be used alone or in combination with the cleaning blade 131.

The image forming apparatus illustrated in FIG. 2 includes a roller-like, fibrous member 132 with which a lubricant 14 is fed onto the surface of the electrophotographic photoreceptor 7 and a flat-brush-like, fibrous member 133 that assists cleaning. However, the image forming apparatus illustrated in FIG. 2 is merely an example, and the fibrous members 132 and 133 are optional.

The components of the image forming apparatus according to this exemplary embodiment are described below.

Charging Device

Examples of the charging device 8 include contact chargers that include a charging roller, a charging brush, a charging film, a charging rubber blade, or a charging tube that are conductive or semiconductive; contactless roller chargers; and known chargers such as a scorotron charger and a corotron charger that use corona discharge.

Exposure Device

The exposure device 9 may be, for example, an optical device with which the surface of the electrophotographic photoreceptor 7 can be exposed to light emitted by a semiconductor laser, an LED, a liquid-crystal shutter, or the like in a predetermined image pattern. The wavelength of the light source is set to fall within the range of the spectral sensitivity of the electrophotographic photoreceptor. Although common semiconductor lasers have an oscillation wavelength in the vicinity of 780 nm, that is, the near-infrared region, the wavelength of the light source is not limited to this; lasers having an oscillation wavelength of about 600 to 700 nm and blue lasers having an oscillation wavelength of 400 nm or more and 450 nm or less may also be used. For forming color images, surface-emitting lasers capable of emitting multi beam may be used as a light source.

Developing Device

The developing device 11 may be, for example, a common developing device that develops latent images with a developer in a contacting or noncontacting manner. The developing device 11 is not limited and may be selected from developing devices having the above functions in accordance with the purpose. Examples of the developing device include known developing devices capable of depositing a one- or two-component developer on the electrophotographic photoreceptor 7 with a brush, a roller, or the like.

In particular, a developing device including a developing roller on which a developer is deposited may be used.

The developer included in the developing device 11 may be either a one-component developer including only a toner or a two-component developer including a toner and a carrier. The developer may be magnetic or nonmagnetic. Known developers may be used as a developer included in the developing device 11.

Cleaning Device

The cleaning device 13 is a cleaning-blade-type cleaning device including a cleaning blade 131.

The cleaning device 13 is not limited to a cleaning-blade-type cleaning device and may be a fur-brush-cleaning-type cleaning device or a cleaning device that performs cleaning during development.

Transfer Device

Examples of the transfer device 40 include contact transfer chargers including a belt, a roller, a film, a rubber blade, or the like; and known transfer chargers which use corona discharge, such as a scorotron transfer charger and a corotron transfer charger.

Intermediate Transfer Body

The intermediate transfer body 50 is a belt-like intermediate transfer body, that is, an intermediate transfer belt, including polyimide, polyamideimide, polycarbonate, polyarylate, polyester, a rubber, or the like that is made semiconductive. The intermediate transfer body is not limited to a belt-like intermediate transfer body and may be a drum-like intermediate transfer body.

Figure 3:
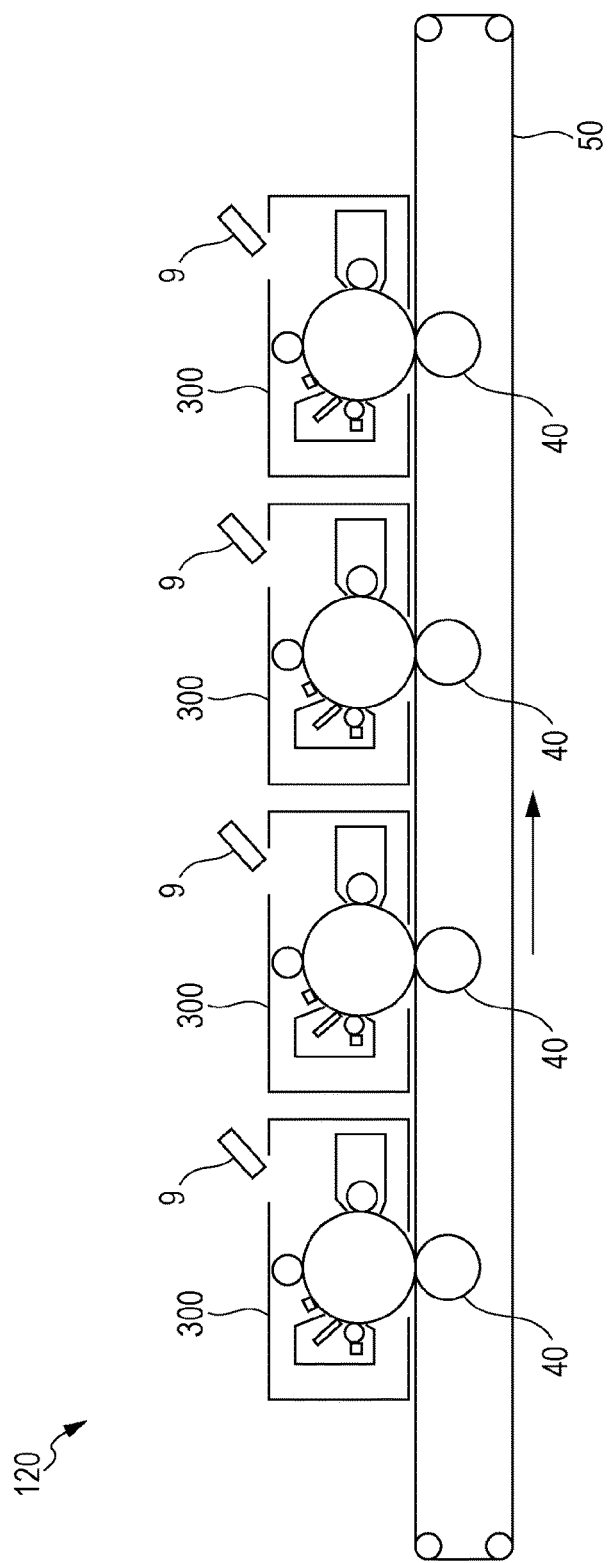
FIG. 3 is a schematic diagram illustrating another example of an image forming apparatus according to an exemplary embodiment.

FIG. 3 schematically illustrates another example of the image forming apparatus according to this exemplary embodiment.

The image forming apparatus 120 illustrated in FIG. 3 is a tandem, multi-color image forming apparatus including four process cartridges 300. In the image forming apparatus 120, the four process cartridges 300 are arranged in parallel to one another on an intermediate transfer body 50, and one electrophotographic photoreceptor is used for one color. The image forming apparatus 120 has the same structure as the image forming apparatus 100 except that the image forming apparatus 120 is tandem.

EXAMPLES

The exemplary embodiments are described in detail below with reference to Examples. The exemplary embodiments are not limited by Examples below. In the following description, all "part" and "%" are on a weight basis unless otherwise specified.

Example 1

With 100 parts by weight of zinc oxide "MZ 300" produced by TAYCA CORPORATION, 10 parts by weight of a 10-weight % toluene solution of N-2-(aminoethyl)-3-aminopropyltriethoxysilane, which serves as a silane coupling agent, and 200 parts by weight of toluene are mixed. The resulting mixture is stirred and then refluxed for two hours. The toluene is distilled off under reduced pressure (10 mmHg). Subsequently, a burn-in surface treatment is performed at 135° C. for 2 hours.

With 33 parts by weight of the surface-treated zinc oxide particles, 6 parts by weight of blocked isocyanate "SUMIDUR 3175" produced by Sumitomo Bayer Urethane Co., Ltd., 1 part by weight of the compound represented by Structural Formula (AK-1) below, which serves as an electron accepting compound, and 25 parts by weight of methyl ethyl ketone are mixed for 30 minutes. To the resulting mixture, 5 parts by weight of butyral resin "S-LEC BM-1" produced by SEKISUI CHEMICAL CO., LTD., 3 parts by weight of silicone beads "TOSPEARL 120" produced by Momentive Performance Materials Inc., and 0.01 parts by weight of silicone oil "SH29PA" produced by Dow Corning Toray Silicone Co., Ltd., which serves as a leveling agent, are added. The mixture is dispersed for three hours with a sand mill to form an undercoat layer forming coating liquid.

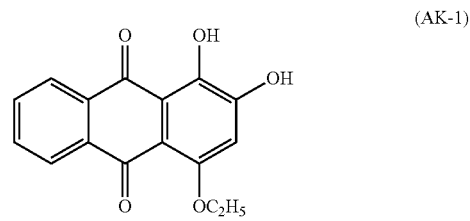 [SMILES: CCOc1cc(O)c(O)c2c1C(=O)c1ccccc1C2=O]

(AK-1)

The undercoat layer forming coating liquid is applied to an aluminum support having a diameter of 30 mm, a length of 365 mm, and a thickness of 1 mm by dip coating. The resulting coating film is cured by drying at 180° C. for 30 minutes to form an undercoat layer having a thickness of 25 µm.

A mixture of a hydroxygallium phthalocyanine pigment (HOGaPc) used as a charge generating material, a vinyl chloride-vinyl acetate-maleic acid copolymer used as a binder resin (a copolymer represented by Formula (4) below, where l, m, and n represent the proportions (mol %) of the respective structural units shown in Table 1), and acetone is charged into a glass bottle having a volume of 100 mL together with glass beads having a diameter of 1.0 mm (filling ratio: 50%). The mixture is dispersed for 2.5 hours with a paint shaker to form a charge generation layer forming coating liquid.

The amount of hydroxygallium phthalocyanine pigment included in the charge generation layer forming coating liquid is set to 55.0% by volume of the total amount of hydroxygallium phthalocyanine pigment and vinyl chloride-vinyl acetate-maleic acid copolymer included in the coating liquid such that the concentration of the solid component in the dispersion liquid (i.e., the charge generation layer forming coating liquid) is 6.0% by weight.

The hydroxygallium phthalocyanine pigment used is a Type-V hydroxygallium phthalocyanine pigment having a diffraction peak at, at least, Bragg angles (2θ±0.2°) of 7.3°, 16.0°, 24.9°, and 28.0° in an X-ray diffraction spectrum measured with the CuKα radiation. The hydroxygallium phthalocyanine pigment has a maximum peak wavelength at 820 nm in an absorption spectrum that covers a wavelength range of 600 nm or more and 900 nm or less, an average particle diameter of 0.12 µm, a maximum particle diameter of 0.2 µm, and a specific surface area of 60 m²/g.

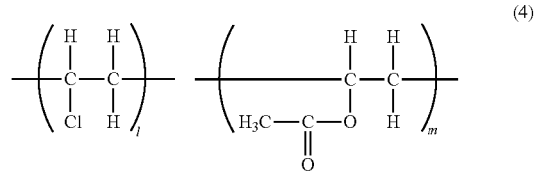

(4)

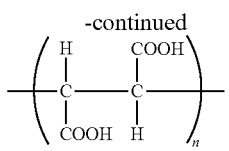

The charge generation layer forming coating liquid is applied to the undercoat layer by dip coating. The resulting coating film is cured by drying at 150° C. for 5 minutes to form a charge generation layer having a thickness of 0.14 μm.

Subsequently, 12 parts by weight of the charge transporting material represented by Structural Formula (CT1A) below, 28 parts by weight of the charge transporting material represented by Structural Formula (CT2A) below, and 60 parts by weight of a bisphenol Z polycarbonate resin (molecular weight: 40,000) are dissolved in 340 parts by weight of tetrahydrofuran to form a charge transport layer forming coating liquid.

The charge transport layer forming coating liquid is applied to the charge generation layer by dip coating. The resulting coating film is cured by drying at 150° C. for 40 minutes to form a charge transport layer having a thickness of 40 μm.

Examples 6 to 10

Electrophotographic photoreceptors of Examples 6 to 10 are prepared as in Examples 1 to 5, respectively, except that the type of the charge generating material used for preparing the charge generation layer forming coating liquid is changed to a chlorogallium phthalocyanine pigment (Cl-GaPc).

Examples 11 to 15

Electrophotographic photoreceptors of Examples 11 to 15 are prepared as in Examples 1 to 5, respectively, except that the type of the charge generating material used for preparing the charge generation layer forming coating liquid is changed to a titanyl phthalocyanine pigment (TiOPc).

Examples 16 and 17

An electrophotographic photoreceptor is prepared as in Example 1, except that the proportions of the structural units constituting the vinyl chloride-vinyl acetate-maleic acid copolymer (i.e., the copolymer represented by Formula (4)), which is used for preparing the charge generation layer forming coating liquid, are changed as described in Table 1.

Comparative Examples 1 to 4

An electrophotographic photoreceptor is prepared as in Example 1, except that the proportions of the structural units

The electrophotographic photoreceptor of Example 1 is prepared by the above process.

Examples 2 to 5

An electrophotographic photoreceptor is prepared as in Example 1, except that the proportions of the structural units constituting the vinyl chloride-vinyl acetate-maleic acid copolymer (i.e., the copolymer represented by Formula (4)), which is used for preparing the charge generation layer forming coating liquid, are changed as described in Table 1.

constituting the vinyl chloride-vinyl acetate-maleic acid copolymer (i.e., the copolymer represented by Formula (4)), which is used for preparing the charge generation layer forming coating liquid, are changed as described in Table 1.

Comparative Examples 5 to 8

Electrophotographic photoreceptors of Comparative examples 5 to 8 are prepared as in Comparative examples 1 to 4, respectively, except that the type of the charge generating material used for preparing the charge generation layer forming coating liquid is changed to a chlorogallium phthalocyanine pigment (ClGaPc).

Comparative Examples 9 to 12

Electrophotographic photoreceptors of Comparative examples 9 to 12 are prepared as in Comparative examples 1 to 4, respectively, except that the type of the charge generating material used for preparing the charge generation layer forming coating liquid is changed to a titanyl phthalocyanine pigment (TiOPc).

Comparative Examples 13 to 17

An electrophotographic photoreceptor is prepared as in Example 1, except that the proportions of the structural units constituting the vinyl chloride-vinyl acetate-maleic acid copolymer (i.e., the copolymer represented by Formula (4)), which is used for preparing the charge generation layer forming coating liquid, are changed as described in Table 1.
Evaluation Each of the electrophotographic photoreceptors prepared in Examples and Comparative examples is attached to an electrophotographic image forming apparatus "APEO-SPORT-V C7776" produced by Fuji Xerox Co., Ltd. A one-centimeter-square, black image (image density: 100%) is formed on a portion of an A3 size paper sheet which extends 147 mm from the front edge of the paper sheet and corresponds to the first image formation cycle. Subsequently, a cyan halftone image (image density: 20%) is formed over the entirety of a portion of the paper sheet which extends from the position 147 mm from the front edge of the paper sheet toward the rear edge and corresponds to the second image formation cycle.

The halftone image is inspected for the difference in image density between the one-centimeter square image and the peripheral portion (positive ghosting) in order to perform visual sensory evaluation (grading). Grading is made on a scale of G0 to G5 in steps of 1G. The smaller the number of G, the lower the difference in image density and the smaller the occurrence of positive ghosting. The acceptable grade of positive ghosting is G3 or less.

All of the images are formed at 10° C. and 15% RH. Table 1 summarizes the results.

TABLE 1

| | Charge generating material | Copolymer Proportions of structural units (mol %) | | | n/m (%) | Evaluation Positive ghosting |
|---|---|---|---|---|---|---|
| | Type | l | m | n | | |
| Example 1 | HOGaPc | 86.0 | 13.4 | 0.6 | 4.48 | G0 |
| Example 2 | HOGaPc | 84.0 | 15.0 | 1.0 | 6.67 | G0 |
| Example 3 | HOGaPc | 82.0 | 17.0 | 1.0 | 5.88 | G0 |
| Example 4 | HOGaPc | 81.0 | 18.0 | 1.0 | 5.56 | G0 |
| Example 5 | HOGaPc | 79.0 | 20.0 | 1.0 | 5.00 | G1 |
| Example 6 | ClGaPc | 86.0 | 13.4 | 0.6 | 4.48 | G0 |
| Example 7 | ClGaPc | 84.0 | 15.0 | 1.0 | 6.67 | G0 |
| Example 8 | ClGaPc | 82.0 | 17.0 | 1.0 | 5.88 | G0 |
| Example 9 | ClGaPc | 81.0 | 18.0 | 1.0 | 5.56 | G0 |
| Example 10 | ClGaPc | 79.0 | 20.0 | 1.0 | 5.00 | G2 |
| Example 11 | TiOPc | 86.0 | 13.4 | 0.6 | 4.48 | G2 |
| Example 12 | TiOPc | 84.0 | 15.0 | 1.0 | 6.67 | G2 |
| Example 13 | TiOPc | 82.0 | 17.0 | 1.0 | 5.88 | G2 |
| Example 14 | TiOPc | 81.0 | 18.0 | 1.0 | 5.56 | G2 |
| Example 15 | TiOPc | 79.0 | 20.0 | 1.0 | 5.00 | G3 |

TABLE 1-continued

| | Charge generating material | Copolymer Proportions of structural units (mol %) | | | n/m (%) | Evaluation Positive ghosting |
|---|---|---|---|---|---|---|
| | Type | l | m | n | | |
| Example 16 | HOGaPc | 84.5 | 15.0 | 0.5 | 3.33 | G3 |
| Example 17 | HOGaPc | 83.9 | 15.0 | 1.1 | 7.33 | G3 |
| Comparative example 1 | HOGaPc | 86.0 | 13.0 | 1.0 | 7.69 | G4 |
| Comparative example 2 | HOGaPc | 87.0 | 12.0 | 1.0 | 8.33 | G5 |
| Comparative example 3 | HOGaPc | 78.0 | 21.0 | 1.0 | 4.76 | G4 |
| Comparative example 4 | HOGaPc | 77.0 | 22.0 | 1.0 | 4.55 | G5 |
| Comparative example 5 | ClGaPc | 86.0 | 13.0 | 1.0 | 7.69 | G4 |
| Comparative example 6 | ClGaPc | 87.0 | 12.0 | 1.0 | 8.33 | G5 |
| Comparative example 7 | ClGaPc | 78.0 | 21.0 | 1.0 | 4.76 | G4 |
| Comparative example 8 | ClGaPc | 77.0 | 22.0 | 1.0 | 4.55 | G5 |
| Comparative example 9 | TiOPc | 86.0 | 13.0 | 1.0 | 7.69 | G4 |
| Comparative example 10 | TiOPc | 87.0 | 12.0 | 1.0 | 8.33 | G5 |
| Comparative example 11 | TiOPc | 78.0 | 21.0 | 1.0 | 4.76 | G4 |
| Comparative example 12 | TiOPc | 77.0 | 22.0 | 1.0 | 4.55 | G5 |
| Comparative example 13 | HOGaPc | 78.2 | 21.0 | 0.8 | 3.81 | G5 |
| Comparative example 14 | HOGaPc | 78.3 | 21.0 | 0.7 | 3.33 | G5 |
| Comparative example 15 | HOGaPc | 78.5 | 21.0 | 0.5 | 2.38 | G5 |
| Comparative example 16 | HOGaPc | 86.0 | 13.0 | 1.0 | 7.69 | G5 |
| Comparative example 17 | HOGaPc | 85.8 | 13.0 | 1.2 | 9.23 | G5 |

The above results confirm that the electrophotographic photoreceptors prepared in Examples reduce the occurrence of image defects caused due to positive ghosting compared with the electrophotographic photoreceptors prepared in Comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:
   a conductive support;
   a charge generation layer disposed on the conductive support, the charge generation layer including a charge generating material and a vinyl copolymer, the vinyl copolymer including
      a structural unit including a chlorine atom,
      a structural unit including an acyloxy group, and
      a structural unit including two or more carboxyl groups,
   the proportion of the structural unit including an acyloxy group to all of the structural units being 14.0 mol % or more and 20.0 mol % or less; and
   a charge transport layer disposed on the charge generation layer.

2. The electrophotographic photoreceptor according to claim 1,
   wherein the proportion of the structural unit including an acyloxy group to all of the structural units constituting the vinyl copolymer is 14.0 mol % or more and 18.0 mol % or less.

3. The electrophotographic photoreceptor according to claim 1, wherein the ratio of the structural unit including two or more carboxyl groups to the structural unit including an acyloxy group is 4.0% or more and 7.0% or less.

4. The electrophotographic photoreceptor according to claim 3,
wherein the ratio of the structural unit including two or more carboxyl groups to the structural unit including an acyloxy group is 4.5% or more and 6.5% or less.

5. The electrophotographic photoreceptor according to claim 3,
wherein the ratio of the structural unit including two or more carboxyl groups to the structural unit including an acyloxy group is 5.0% or more and 6.0% or less.

6. The electrophotographic photoreceptor according to claim 1,
wherein the proportion of the structural unit including two or more carboxyl groups to all of the structural units constituting the vinyl copolymer is 0.5 mol % or more and 1.4 mol % or less.

7. The electrophotographic photoreceptor according to claim 6,
wherein the proportion of the structural unit including two or more carboxyl groups to all of the structural units constituting the vinyl copolymer is 0.6 mol % or more and 1.1 mol % or less.

8. The electrophotographic photoreceptor according to claim 1,
wherein the structural unit including a chlorine atom is represented by General Formula (1) below, the structural unit including an acyloxy group is represented by General Formula (2) below, and the structural unit including two or more carboxyl groups is represented by General Formula (3) below,

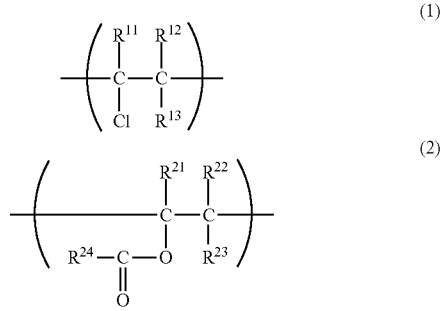

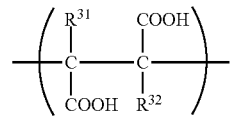

where, in General Formula (1), $R^{11}$ to $R^{13}$ each independently represent a hydrogen atom or an alkyl group having 1 to 5 carbon atoms; in General Formula (2), $R^{21}$ to $R^{23}$ each independently represent a hydrogen atom or an alkyl group having 1 to 5 carbon atoms and $R^{24}$ represents an alkyl group having 1 to 5 carbon atoms; and, in General Formula (3), $R^{31}$ and $R^{32}$ each independently represent a hydrogen atom or an alkyl group having 1 to 5 carbon atoms.

9. The electrophotographic photoreceptor according to claim 8,
wherein, in General Formula (1), all of $R^{11}$ to $R^{13}$ represent a hydrogen atom; in General Formula (2), all of $R^{21}$ to $R^{23}$ represent a hydrogen atom and $R^{24}$ represents a methyl group; and, in General Formula (3), both of $R^{31}$ and $R^{32}$ represent a hydrogen atom.

10. The electrophotographic photoreceptor according to claim 1,
wherein the charge generating material is a phthalocyanine pigment.

11. The electrophotographic photoreceptor according to claim 10,
wherein the phthalocyanine pigment is chlorogallium phthalocyanin, hydroxygallium phthalocyanine, or a combination thereof.

12. A process cartridge detachably attachable to an image forming apparatus, the process cartridge comprising the electrophotographic photoreceptor according to claim 1.

13. An image forming apparatus comprising:
the electrophotographic photoreceptor according to claim 1;
a charging unit that charges a surface of the electrophotographic photoreceptor;
an electrostatic latent image forming unit that forms an electrostatic latent image on the charged surface of the electrophotographic photoreceptor;
a developing unit that develops the electrostatic latent image formed on the surface of the electrophotographic photoreceptor with a developer including a toner in order to form a toner image; and
a transfer unit that transfers the toner image onto a surface of a recording medium.

* * * * *